Aug. 8, 1967     F. C. GOLDSMITH     3,335,158
CONTINUOUS PROCESS FOR REACTING A BASIC GROUP II METAL
COMPOUND AND A PHOSPHORUS ACID
Filed Oct. 23, 1961
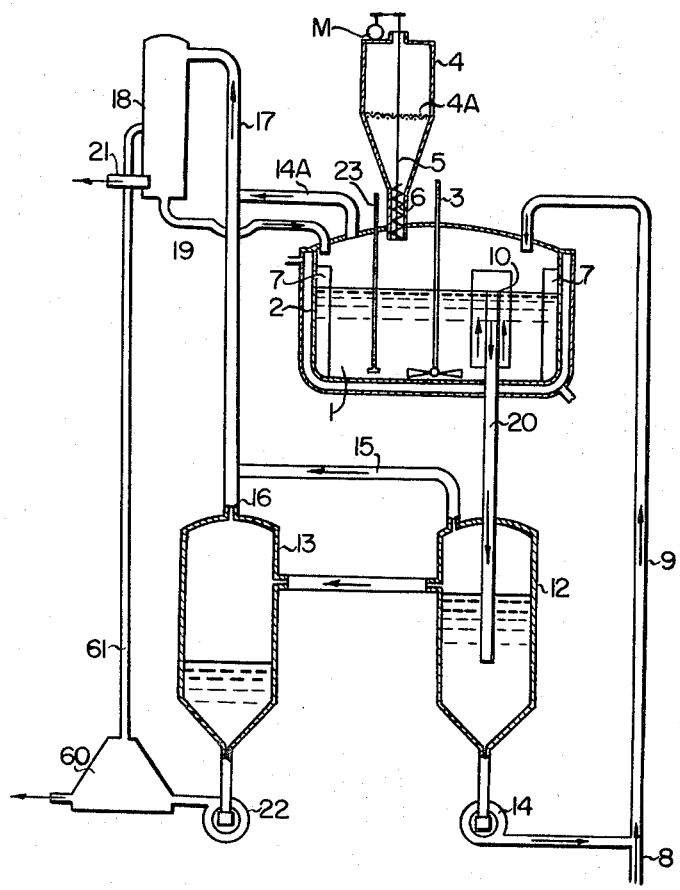
INVENTOR.
FRED CORWIN GOLDSMITH
BY
Oberlin, Maky & Donnelly
ATTORNEYS

United States Patent Office 3,335,158
Patented Aug. 8, 1967

3,335,158
CONTINUOUS PROCESS FOR REACTING A BASIC GROUP II METAL COMPOUND AND A PHOSPHORUS ACID
Fred Corwin Goldsmith, Painesville, Ohio, assignor to The Lubrizol Corporation, Wickliffe, Ohio, a corporation of Ohio
Filed Oct. 23, 1961, Ser. No. 132,316
4 Claims. (Cl. 260—429.9)

This invention relates as indicated to a process and apparatus for reacting a plurality of reagents, at least one of which is a liquid, and at least one of which is a solid, and more particularly wherein the specific gravities of said fluid and solid reagents are substantially different.

This application is a continuation-in-part of application Ser. No. 723,922, filed Mar. 25, 1958, and now abandoned, said abandoned application having in turn been filed as a continuation-in-part of application Ser. No. 262,600, filed Dec. 20, 1951, and now U.S. 2,862,947. This application is a continuation-in-part also of application Ser. No. 680,882 (now U.S. 3,086,849), filed Aug. 28, 1957, which application is a division of the above application Ser. No. 262,600.

By the present invention, the reaction is carried out with the reagents in the form of a slurry which is continuously circulated. By continuous or intermittent replenishment of the reagents taken up by the reaction and preferably also by the continuous or intermittent withdrawal of the products formed, the process may be made fully continuous.

The process and apparatus of this invention are adapted for use with both endothermic and exothermic reactions since it is relatively easy to effect the necessary temperature control as by heating or cooling of the reaction mass as it is circulated.

As indicated, the invention is particularly adapted for use in reactions wherein the reagents have measurable differences in specific gravity and especially in connection with reactions which permit the presence in the reaction mass of substantial excesses of one of the reagents, since by maintaining those conditions it has been found possible to control the rate of replenishment of the reagents by such simple means as density responsive equipment.

More particularly, the invention is applicable to reactions such as those in which a solid such as a phosphorus sulfide is reacted with an organic hydroxy compound such as an alcohol, phenol, or naphthol in the production of phosphorodithioic acids. The invention is applicable also to the preparation of metal salts of organic acids such as phosphorodithioic acids and sulfonic acids.

It is therefore a principal object of this invention to provide a process by which reactions of the character defined may be carried out expeditiously, at low cost, and by the use of simple equipment which may be readily controlled.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Broadly stated, this invention comprises the process of reacting solid and liquid reagents to form a liquid product, including the steps of continuously circulating in a closed system a slurry of at least one solid reagent, the mapor portion of the liquid phase of said slurry being inert to the desired reaction, introducing into said closed system at least one liquid reagent at rates so as to maintain said solid reagent at every point in said system in amounts greatly in excess of the minimum amounts required for complete reaction with the amount of liquid reagent present at that point, maintaining the temperature of the continuously circulating stream of slurry for a substantial portion of its circulating cycle at a temperature favorable to the desired reaction, and drawing off from the system liquid product at about its rate of formation.

Referring now more particularly to the preferred form of my invention in the drawing, one hundred gallons of slurry 1, comprising solid reagents such as a phosphorus sulfide suspended in a mixture of a small proportion of liquid reagent such as an alkylated hydroxyaromatic compound and a relatively large proportion of a diluent, which can be an inert material or preferably the liquid product of the reaction of the solid reagent with the liquid reagent, is maintained at a uniform temperature in reactor 2. The solid reagents form the solid phase and the diluent the liquid phase of the slurry. The slurry is agitated in the kettle by stirrer 3 and vanes 7 attached to the wall of the kettle. The powdered solid reagent is loaded into feed hopper 4 located above reactor 2. The solid reagent is continuously fed into the reactor 2 from hopper 4 by means of a revolving vertical screw 5 extending into the top of the reactor. The screw 5 fits the barrel 6 of the hopper 4 closely and provides gas-tight seal between hopper 4 and kettle 2. The liquid reagent is continuously fed into the slurry by line 8 connected to line 9, or if desired by a line connected into the top of reactor 2. The liquid reagent and solid reagent react in reactor 2, forming a liquid product and liberating a gas. A vertical weir 10 is provided in reactor 2. A baffle 11 is spaced from weir 10 and provides a quiescent zone around the weir 10. A portion of the slurry in the reactor overflows continuously weir 10 and flows down line 20 into solids separator 12 located below the reactor. The decanted liquid phase of the slurry, essentially free of solid reagent, overflows the side of separator 12, into the receiver 13. The solid reagent enriched separator slurry stream is fed to a pump 14 and returned to the reactor 2 by line 9. The liquid phase of the slurry is pumped from the receiver 13 by pump 22 to suitable storage tanks, not shown. If the diluent is a material other than the reaction product of the solid and liquid reagents, further steps will have to be taken to separate the diluent and product. For this purpose a flash evaporator 60 can be employed to evaporate the diluent and conduct the diluent vapor by line 61 to cooler 18 where the diluent is condensed and returned to the slurry by line 19. Thus, it is desirable for most purposes to use where possible the reaction product as the diluent.

The by-product gas atmospheres in the reactor 2, separator 12, and receiver 13 are collected in lines 14A, 15, 16, respectively, connected to common line 17. The by-product gas liberated is normally saturated with evaporated liquid reagent. The gas stream is passed by common line 17 to gas cooler 18, and the liquid reagent condensate is run back into reactor 2 by line 19. The cooled gas then passes to an absorber by line 21, not shown, or is disposed of in some other way.

The specific gravity of the solid reagent is substantially different from the liquid phase of the slurry so that, as the concentration of solid reagent in the slurry increases, the density increases; and as the concentration of solid reagent in the slurry decreases, the density decreases. Thus, the measured density provides a means for controlling the feed ratios of the reagents. The liquid reagent feed may be kept constant and the solid reagent feed varied, or the solid reagent feed may be held constant and the liquid reagent feed varied. The first method is used in this unit, but the latter method may be used equally well.

The solid reagent should have a specific gravity that is substantially different fro mthe liquid phase of the slurry. In the process and apparatus of this invention it is desirable to employ a solid reagent with a specific gravity substantially greater than the specific gravity of the liquid phase of the slurry.

The solid reagent employed should be in a finely divided state, and it is preferable to use a solid reagent which will pass through No. 20 U.S. Standard Screen.

In the preparation of phosphorus thioic acids the solid reagent can be a phosphorus sulfide, for example:

Phosphorus disulfide—$P_3S_6(PS_2)$
Phosphorous trisulfide—$P_4S_6(P_2S_3)$
Phosphorus sesquisulfide—$P_4S_3$
Phosphorous pentasulfide—$P_2S_5(P_4S_{10})$
Phosphorus heptasulfide—$P_4S_7$ For many purposes, phosphorous pentasulfide will be found especially useful as a solid reagent.

The liquid reagent, in such a preparation, may be an alkylated hydroxyaromatic compound, i.e., an alkylated phenolic compound. Thus it may be an alkylated phenol or an alkylated naphthol; illustrative examples include butyl phenol, octyl phenol, dodecyl phenol, octadecyl phenol, α-hexyl β-naphthol, β-decyl α-naphthol, α-eicosyl β-naphthol, and polyisobutyl-substituted α-naphthol in which the polyisobutyl substituent is derived from a polyisobutene having an average molecular weight of 1,000.

If the alkylated hydroxyaromatic compound is a solid it can be dissolved in an inert solvent and in that manner be employed as a liquid reagent in the process.

The liquid reagent may also be an alcohol, for example a monohydric or dihydric alcohol. The following table summarizes typical operating conditions in the process and apparatus described above for the preparation of phosphorodithioic acids by the reaction of $P_2S_5$ and various alcohols.

dithioic acid and $P_2S_5$, is continuously circulated from reactor 2, over weir 10, to separator 12, and then back to reactor 2 by pump 14 and line 9. When the density of the slurry increases in reactor 2 above a certain value, an automatic control shuts the $P_2S_5$ feed off until the density falls below a particular point, at which time the $P_2S_5$ feed is resumed automatically. The $P_2S_5$ is maintained at every point in the system in amounts greatly in excess of the minimum amounts required for complete reaction with the alcohol present at that point. Thus, the alcohol when introduced into the slurry reacts almost immediately with the $P_2S_5$ to insure accurate control of the rates of feed by the densometer. The organo phosphorodithioic acid is decanted essentially free of $P_2S_5$ from separator 12 to receiver 13. It has been found that it is equally satisfactory to vary the alcohol feed rate while maintaining constant the $P_2S_5$ feed rate.

While the above data relate to the reaction of phosphorus pentasulfide and alcohols, the process is applicable also to the reaction of phosphorus sulfides and hydroxyaromatic compounds such as phenols and naphthols. This is rather unexpected because, although the chemistry of the reaction of phenolic compounds with phosphorus pentasulfide is analogous to the chemistry of the reaction of alcohols with phosphorus pentasulfide, the engineering features of the two reactions are obviously quite dissimilar. Alcohols differ markedly from phenolic compounds not only as to their physical properties, viz., alcohols generally are liquids whereas phenolic compounds are for the most part solids, but also in their relative chemical activities.

The process of this invention was found to be satisfactorily operable for reactions involving hydroxyaromatic compounds, particularly alkylated hydroxyaromatic compounds, with phosphorus sulfides generally.

As indicated above, the preparation of metal salts of the aromatic and aliphatic substituted phosphorodithioic acids may be effected in the same manner and in the same apparatus as the acids. Likewise, metal salts of other organic acids, e.g., metal sulfonates, can be prepared in this fashion. In such cases the solid reagent is a basic

| Item | Condition | Type of Alcohol | | |
|---|---|---|---|---|
| | | Methyl-iso-butyl carbinol | Iso-Propyl alcohol | Blend [1] |
| A | Alcohol feed rate, lbs./hr | 472 | 277 | 700 |
| B | $P_2S_5$ feed rate, lbs./hr | 244 | 244 | 293 |
| C | Acid rate, lbs./hr | 619 | 483 | 948 |
| D | $H_2S$ rate, lbs./hr | 37 | 38 | 45 |
| E | Operating Temp., °F | 210 | 170 | 210 |
| F | Operating Density | 0.955–0.972 | 1.040–1.058 | 0.918–0.936 |
| G | Percent $P_2S_5$ in slurry | 6–8 | 6–8 | 6–8 |

[1] Blend, 37.5% n-octyl alcohol, 37.5% methyl-iso-butyl carbinol, 25% n-hexyl alcohol.

To persons skilled in the art, a description of the operation of the process and apparatus constituting the present invention will be found useful. In the preparation of phosphorodithioic acids by the reaction of $P_2S_5$ and alcohols or alkylated hydroxyaromatic compounds, the reaction is illustrated by the following equation:

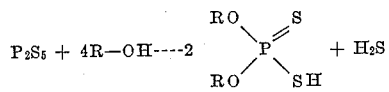

$$P_2S_5 + 4R-OH \longrightarrow 2 \begin{array}{c} RO \\ \diagdown \\ P \\ \diagup \diagdown \\ RO \quad SH \end{array} \!\!\!\!\!\!\!\!\!\!\!\! \diagup\!\!\!\!S + H_2S$$

The liquid phosphorodithioic acid is preferred as the diluent in this process. The alcohol is fed into reactor 2 heated to reaction temperature (see item E in the table above) after the alcohol overflows weir 10, the alcohol is shut off. The $P_2S_5$ feed is begun (see item B in the table above), and as the density approaches the desired range (see item F above) the alcohol feed is begun at one-half the normal feed rate (see item A above). Over a four hour period the alcohol feed rate is gradually increased to normal. The slurry, comprising essentially phosphoroinorganic compound and the liquid reagent is a phosphorodithioic or sufonic acid.

Suitable metal salts include those of metals in Groups I, II and III of the Periodic Table and especially the alkali metals, alkaline earth metals, and zinc.

An illustrative preparation of zinc phosphorodithioate by this process is a preparation of the zinc salt of a phosphorodithioic acid prepared in turn by the reaction of four moles of a 65:35 molar mixture of isobutyl and primary amyl alcohols with 1.0 mole of $P_2S_5$. The solid reagent in this particular reaction is the zinc oxide and the liquid reagent is a solution consisting of 69.5 parts of the corresponding phosphorodithioic acid, 10.6 parts of mineral oil, and 19.9 parts of a 65:35 molar mixture of isobutyl and primary amyl alcohols. The temperature of the process mixture is maintained at 190–195° F. throughout the period of reaction.

An illustration of the applicability of the process to the preparation of the metal sulfonate is the preparation of a zinc sulfonate. Here again the solid reagent is zinc oxide; the liquid reagent is a solution of 22 percent by weight of petroleum sulfonic acid in 25 percent of isopropyl alcohol, and 50.5 percent of mineral oil (2.5 percent of sodium petroleum sulfonate being present as an impurity). The temperature of the reaction in this example is 135–140° F.

The above examples illustrate the wide applicability of the process of this invention and it is thus apparent that the process can readily be adapted to the preparation of such metal salts as calcium sulfonates, barium sulfonates, magnesium sulfonates, sodium sulfonates, calcium phosphorodithioates, barium phosphorodithioates, potassium phosphorodithioates, etc.

Illustrative examples of pairs of liquid reagents and solid reagents which are reacted advantageously according to the process of this invention are shown below.

| Liquid Reagent | Solid Reagent | |
| --- | --- | --- |
|  | Identity | Percent Stoichiometric Excess |
| (1) Eicosyl salicylic acid (25% solution in xylene). | CdO | 200 |
| (2) Mono-nitro polybutene* (20% solution in isobutyl alcohol). | BaO | 400 |
| (3) Dinonyl thiophenol (30% solution in toluene). | SrO | 250 |
| (4) Turpentine (25% solution in orthodichlorobenzene). | $P_2S_5$ | 150 |
| (5) Di-(laurylphenyl) phosphinodithioic acid (40% solution in mesitylene). | ZnO | 300 |
| (6) Didodecylbenzene sulfonic acid (30% solution in SAE 10 mineral oil). | MgO | 400 |
| (7) Dilauryl phosphoric acid (50% solution in xylene). | ZnO | 300 |

*Polybutene of about 750 molecular weight.

What is claimed is:

1. In the process of reacting a basic Group II metal compound and phosphinodithioic acid to form a liquid product, the steps of continuously circulating in a closed system a slurry of said basic Group II metal compound, a major proportion of the liquid phase of said slurry being inert to the desired reaction, introducing into said closed system said basic Group II metal compound and said phosphinodithoic acid, at rates so as to maintain said basic Group II metal compound at every point in said system in amounts greatly in excess of the minimum amounts required for complete reaction with the amount of said phosphinodithioic acid present at that point, maintaining the temperature of the continuously circulating stream of said slurry for a substantial portion of a circulating cycle at a temperature favorable to the desired reaction and drawing off from the system a liquid product at about its rate of formation.

2. In the process of reacting a basic Group II metal compound and a phosphorodithioic acid to form a liquid product, the steps of continuously circulating in a closed system a slurry of said basic Group II metal compound, a major proportion of the liquid phase of said slurry being inert to the desired reaction, introducing into said closed system said basic Group II metal compound and said phosphorodithioic acid, at rates so as to maintain said basic Group II metal compound at every point in said system in amounts greatly in excess of the minimum amounts required for complete reaction with the amount of said phosphorodithioic acid present at that point, maintaining the temperature of the continuously circulating stream of said slurry for a substantial portion of a circulating cycle at a temperature favorable to the desired reaction and drawing off from the system a liquid product at about its rate of formation.

3. In the process of reacting a zinc oxide and a di-(laurylphenyl)phosphinodithioic acid to form a liquid product, the steps of continuously circulating in a closed system a slurry of said zinc oxide, a major proportion of the liquid phase of said slurry being inert to the desired reaction, introducing into said closed system said zinc oxide and said di-(laurylphenyl)phosphinodithioic acid, at rates so as to maintain said zinc oxide at every point in said system in amounts greatly in excess of the minimum amounts required for complete reaction with the amount of said di-(laurylphenyl)phosphinodithioic acid present at that point, maintaining the temperature of the continuously circulating stream of said slurry for a substantial portion of a circulating cycle at a temperature favorable to the desired reaction and drawing off from the system a liquid product at about its rate of formation.

4. In the process of reacting a zinc oxide and a dilauryl phosphoric acid to form a liquid product, the steps of continuously circulating in a closed system a slurry of said zinc oxide, a major proportion of the liquid phase of said slurry being inert to the desired reaction, introducing into said closed system said zinc oxide and said dilauryl phosphoric acid, at rates so as to maintain said zinc oxide at every point in said system in amounts greatly in excess of the minimum amounts required for complete reaction with the amount of said dilauryl phosphoric acid present at that point, maintaining the temperature of the continuously circulating stream of said slurry for a substantial portion of a circulating cycle at a temperature favorable to the desired reaction and drawing off from the system a liquid product at about its rate of formation.

References Cited

UNITED STATES PATENTS

| | | | |
| --- | --- | --- | --- |
| 1,947,852 | 2/1934 | Jewett | 260—698 X |
| 2,078,421 | 4/1937 | Shuman | 260—461.312 |
| 2,374,507 | 4/1945 | Schulze | 260—698 X |
| 2,480,673 | 8/1949 | Reiff et al. | 260—461.113 |
| 2,506,310 | 5/1950 | Mikeska | 260—461.113 |
| 2,595,170 | 4/1952 | Rudel et al. | 260—461 |
| 2,624,750 | 1/1953 | Pechukas | 260—461.312 |
| 2,665,295 | 1/1954 | Augustine | 260—461 |
| 2,738,326 | 3/1956 | Anderson et al. | 260—504 |
| 2,862,947 | 12/1958 | Goldsmith | 260—461.113 |

FOREIGN PATENTS 745,858  3/1956  British.

OTHER REFERENCES

Kosolapoff: "Organo-Phosphorus Compounds," John Wiley and Sons (1950), p. 256.

CHARLES B. PARKER, *Primary Examiner.*

M. LIEBMAN, *Examiner.*

J. R. GENTRY, RICHARD L. RAYMOND, F. M. SIKORA, *Assistant Examiners.*